I *United States Patent*

Hirayama et al.

(10) Patent No.: US 9,284,913 B2
(45) Date of Patent: Mar. 15, 2016

(54) METAL GASKET

(75) Inventors: Shinichi Hirayama, Saitama (JP); Akinori Sueyoshi, Saitama (JP); Yosuke Matsumoto, Saitama (JP); Akihiro Ito, Saitama (JP)

(73) Assignee: NIPPON LEAKLESS INDUSTRY CO., LTD., Tokyo (JP)

( * ) Notice: Subject to any disclaimer, the term of this patent is extended or adjusted under 35 U.S.C. 154(b) by 46 days.

(21) Appl. No.: 14/122,076

(22) PCT Filed: Apr. 17, 2012

(86) PCT No.: PCT/JP2012/002644
§ 371 (c)(1),
(2), (4) Date: Nov. 25, 2013

(87) PCT Pub. No.: WO2012/160751
PCT Pub. Date: Nov. 29, 2012

(65) Prior Publication Data
US 2014/0097576 A1 Apr. 10, 2014

(30) Foreign Application Priority Data
May 26, 2011 (JP) .................................. 2011-118507

(51) Int. Cl.
F02F 11/00 (2006.01)
F16J 15/08 (2006.01)

(52) U.S. Cl.
CPC ........... *F02F 11/002* (2013.01); *F16J 15/0825* (2013.01); *F16J 15/0887* (2013.01);
(Continued)

(58) Field of Classification Search
CPC ................ F16J 15/0818; F16J 15/0887; F16J 2015/085; F16J 15/0862; F16J 15/0868
See application file for complete search history.

(56) References Cited

U.S. PATENT DOCUMENTS 4,203,608 A 5/1980 Nicholson
4,335,890 A 6/1982 Nicholson
(Continued)

FOREIGN PATENT DOCUMENTS

JP 01-285644 A 11/1989
JP H01285645 * 11/1989
(Continued)

OTHER PUBLICATIONS

International Search Report, PCT/JP2012/002644, mailed Jul. 10, 2012 (2 pages).
(Continued)

*Primary Examiner* — Nicholas L Foster
(74) *Attorney, Agent, or Firm* — Thomas Engellenner; Reza Mollaaghababa; Pepper Hamilton LLP (57) ABSTRACT

There is provided a metal gasket that is at low cost yet with high sealing performance. A metal gasket 1 includes at least one metal gasket substrate 2 having a circumferential bead 14 formed circumferentially around a cylinder hole 6. The circumferential bead 14 includes a first bead portion 20 formed of a pair of inclined walls 20a, 20b each extending from the gasket substrate to a tip end, the tip ends of the pair of the inclined walls being spaced from each other, and a second bead portion 21 extending from the tip ends of the inclined walls 20a, 20b in a direction opposite to the protruding direction of the inclined walls. The following relationships are satisfied: Fh1>Fh2, and W1>W2, where Fh1 is a height of the first bead portion 20, Fh2 is a height of the second bead portion 21, W1 is a half of a width of the circumferential bead 14, and W2 is a width of the second bead portion 21.

3 Claims, 11 Drawing Sheets (52) U.S. Cl.
CPC ..... *F16J2015/085* (2013.01); *F16J 2015/0862* (2013.01); *F16J 2015/0868* (2013.01); *F16J 2015/0875* (2013.01)

(56) References Cited

U.S. PATENT DOCUMENTS

| | | | |
|---|---|---|---|
| 2006/0061045 A1* | 3/2006 | Burg | 277/593 |
| 2007/0290452 A1* | 12/2007 | Matsushita et al. | 277/595 |
| 2008/0047636 A1* | 2/2008 | Sasaki et al. | 148/559 |
| 2014/0265154 A1* | 9/2014 | Lesnau, IV | 277/594 |

FOREIGN PATENT DOCUMENTS

| | | |
|---|---|---|
| JP | 199021370 A | 2/1990 |
| JP | 199022656 A | 2/1990 |
| JP | 07-243531 A | 9/1995 |
| JP | 2006-090549 A | 4/2006 |
| WO | 2010/073796 A1 | 7/2010 |

OTHER PUBLICATIONS

Office Action in Applicant's corresponding Japanese App. No. 2011-118507, dated Nov. 21, 2014 (3 pages).

Office Action in Applicant's corresponding Chinese App. No. 2012800253998, dated Feb. 27, 2015 (8 pages).

\* cited by examiner

Test piece TP1

(b)

Test piece TP2

(c)

Test piece TP3

FIG. 14

METAL GASKET

TECHNICAL FIELD

The present invention relates to a metal gasket interposed on a joint surface between a cylinder head and a cylinder block of an internal combustion engine to prevent leakage of fluid such as combustion gas, cooling water, and lubricating oil, and particularly relates to a technique for preventing the leakage of high pressure combustion gas around a cylinder hole.

BACKGROUND ART

Figure 6:
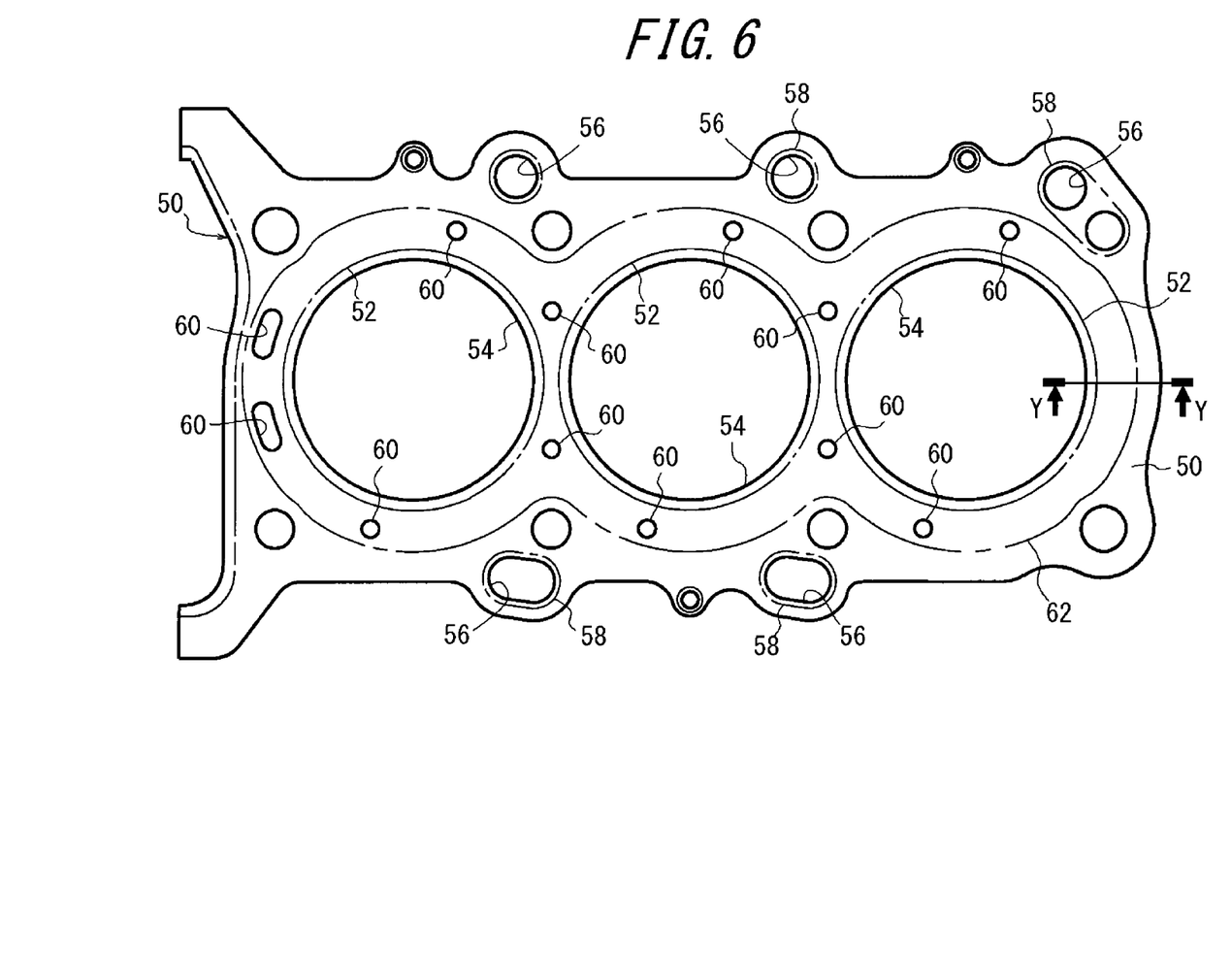
FIG. 6 is a plan view of a stacked-up type metal gasket formed with gasket substrates stacked up on top of one another.
Figure 7:
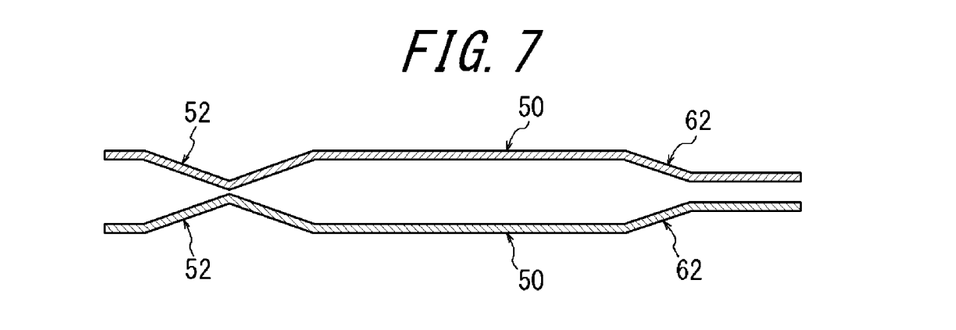
FIG. 7 is a cross-section view taken along a line Y-Y of FIG. 6.
Figure 8:
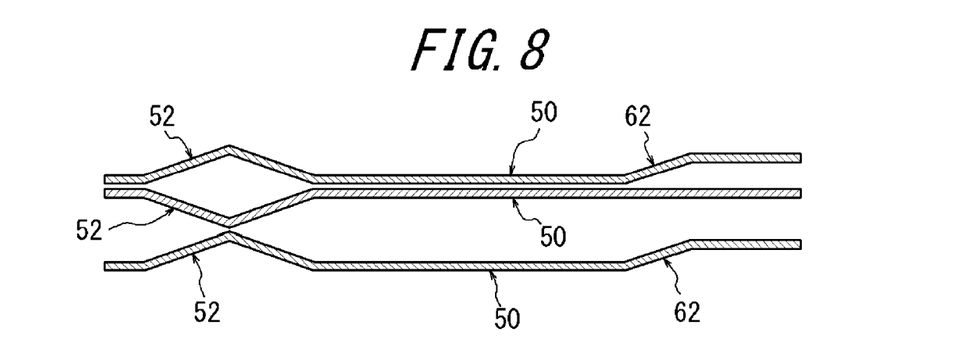
FIG. 8 is a cross-section view is a cross-section view of the metal gasket of another modified example according to the present invention as viewed in the same manner as in FIG. 7.

Generally, a metal gasket is provided with a bead that is compressed and elastically deformed, by a fastening force applied to a tightening bolt for fastening a cylinder head to a cylinder block, to form a seal line on deck surfaces of the cylinder head and the cylinder block which brings a seal therebetween. Conventionally, a metal gasket of this type of metal gasket has been known that has, in order to prevent leakage of high pressure combustion gas in a cylinder bore into an adjacent cylinder or a cooling water hole which might lead to a malfunction such as a decrease in engine output and overheating or a decrease in efficiency of exhaust gas purification due to incomplete combustion gas, a gasket substrate 50 which is composed of a steel plate (e.g. SUS301-H 0.2t) coated with rubber having the thickness of about 0.025 mm on one side or both sides. As shown in FIGS. 6 and 7, the gasket substrate 50 is provided with full beads 52 each having an angle section and arranged around a respective cylinder hole 54, half beads 58 each surrounding a respective oil hole to prevent leakage of fluid such as cooling water and lubricating oil, and a half bead 62 for sealing cooling water holes 60 surrounding all of the full beads 52 around the cylinder holes 54 without enclosing the half beads 58 for oil holes. FIG. 8 shows a metal gasket having a three layered structure formed with three pieces of the above-mentioned gasket substrates 50 stacked up on top of one another.

The reason why the half and full beads are provided on the gasket substrates in accordance with the purpose of sealing is that the restoring forces against the fastening forces from the tightening bolts are different between the half and full beads. That is, the pressure of high-pressure combustion gas in the cylinder reaches 60 to 100 kg/cm$^2$, so that the full bead with relatively larger restoring force which yields large fastening pressure is provided around the cylinder hole to seal the high pressure combustion gas. On the other hand, pressure of fluid such as the cooling water and lubrication oil is about 3 to 6 kg/cm$^2$, so that the fluid can be sufficiently sealed by the half bead having smaller restoring force than that of the full bead.

However, since the outputs of engines have been increased to involve higher pressure of the combustion gas in recent years, better sealing performance of the gasket is thus demanded. Most of metal gaskets having simple stack-up configurations as shown in FIGS. 6 to 8 cannot seal the combustion gas that has been highly pressurized. In particular, even when a cylinder head and a cylinder block of an internal combustion engine with high output are fastened by tightening bolts, a head-lift phenomenon that the cylinder head is raised by the pressure of the combustion gas becomes more noticeable. The head lift phenomenon causes a decrease on fastening pressure of the gasket interposed between the cylinder head and the cylinder block to deteriorate the sealing performance of the gasket against the combustion gas in the cylinder.

Figure 9:
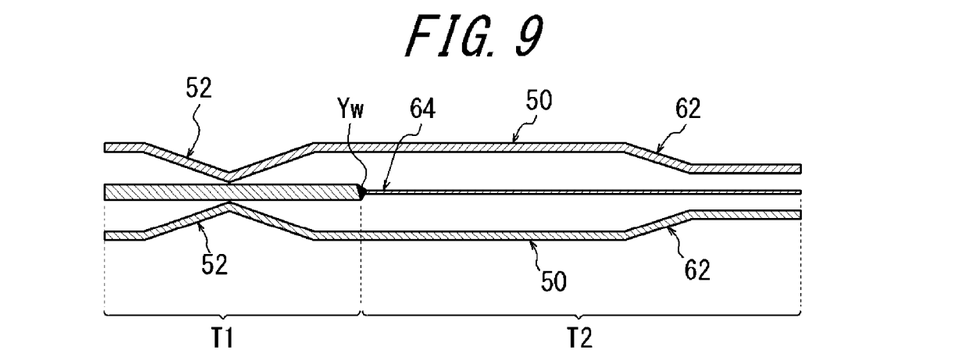
FIG. 9 is a cross-section view of a step type metal gasket with a sub-plate having a step interposed between two gasket substrates as viewed in the same manner as in FIG. 7.

As a metal gasket to solve the above described problem concerning the insufficient pressure of the gasket associated with the high engine power output, it has been proposed that, as shown in FIG. 9, a sub-plate 64 that has a thickness difference (step) formed by a thick plate portion T1 and a thin plate portion T2 is interposed between the above-mentioned gasket substrates so that the full beads 52 of the gasket substrates 50 are entirely situated on the thick plate T1, and the fastening pressure of each full beads 52 around the each cylinder hole 54 of the gasket substrate 50 is raised to improve sealing performance for the combustion gases in the cylinders.

Figure 10:
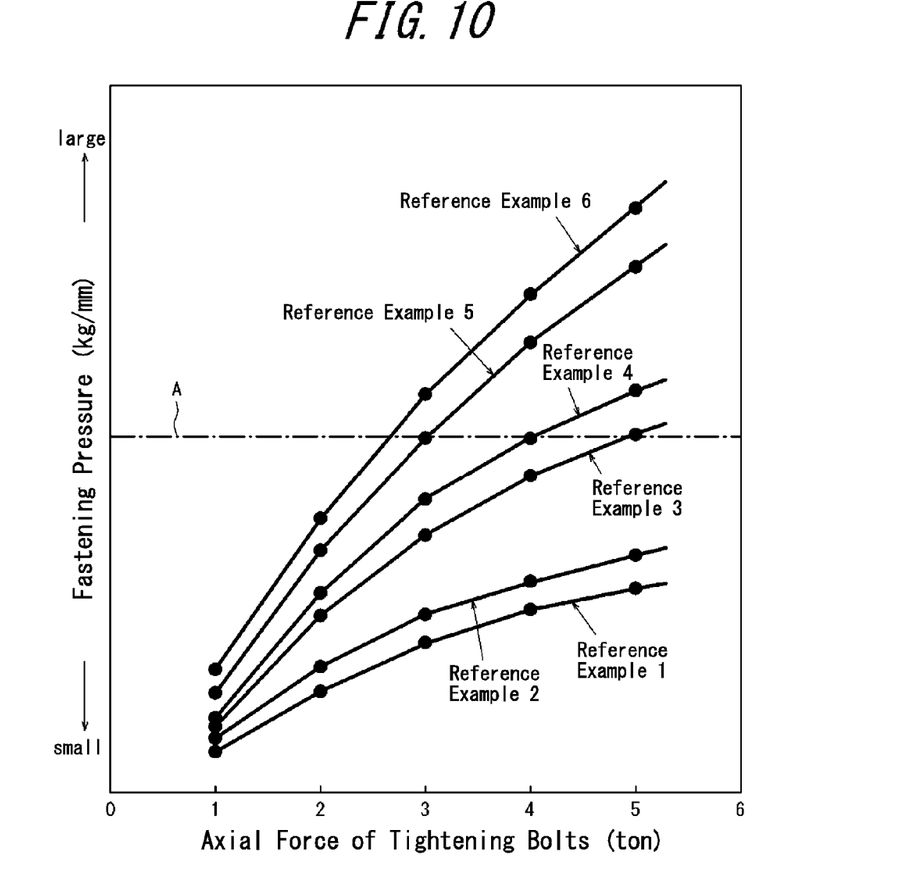
FIG. 10 shows graphs that represent relationships between the fastening axial force and the fastening pressure of the bolts in the metal gasket of the reference examples.

For the purpose of reference, stacked-up type metal gaskets as shown in FIGS. 6 to 8 and a metal gasket having a sub-plate interposed between two gasket substrates facing oppositely to each other as shown in FIG. 9 (referred to below simply as the "step-type metal gasket") were made by way of experiment, and the fastening pressure around the cylinder holes of the respective metal gaskets were measured. The results are shown in FIG. 10. Reference 1 is a metal gasket having a two-layer structure (see FIGS. 6 and 7). Reference 2 is a metal gasket having a three-layer structure (see FIG. 8). References 3 to 6 are metal gaskets having a step-type structure (see FIG. 9). Here, the thickness difference in the plate (the thickness difference between the thick plate portion T1 and the thin plate portion T2, also referred to below simply as the "step difference") is 0.03 mm in Reference 3, 0.05 mm in Reference 4, 0.08 mm in Reference 5, 0.10 mm in Reference 6. It is shown in FIG. 10 that the metal gaskets of References 1 and 2 that do not have a sub plate do not reach required fastening pressure A (kg/mm) even when an axial force of the clamping bolts has been increased, and, therefore, a sufficient sealing performance for the high-pressure combustion gas cannot be obtained. It is noted that the test was conducted through measuring the fastening pressure when the head lift phenomenon occurred. In particular, the metal gaskets were installed in the engine; clamping bolts are screwed with a predetermined axial force; subsequently, $N_2$ gas was charged into the cylinder at a pressure equivalent to the maximum pressure (kg/cm$^2$) of the combustion gas in the engine to force the head lift to occur; the fastening pressure around the cylinder holes was measured after the occurrence of the head lift; and the measured fastening pressure was assumed as the fastening pressure supported by the full beads.

Figure 11:
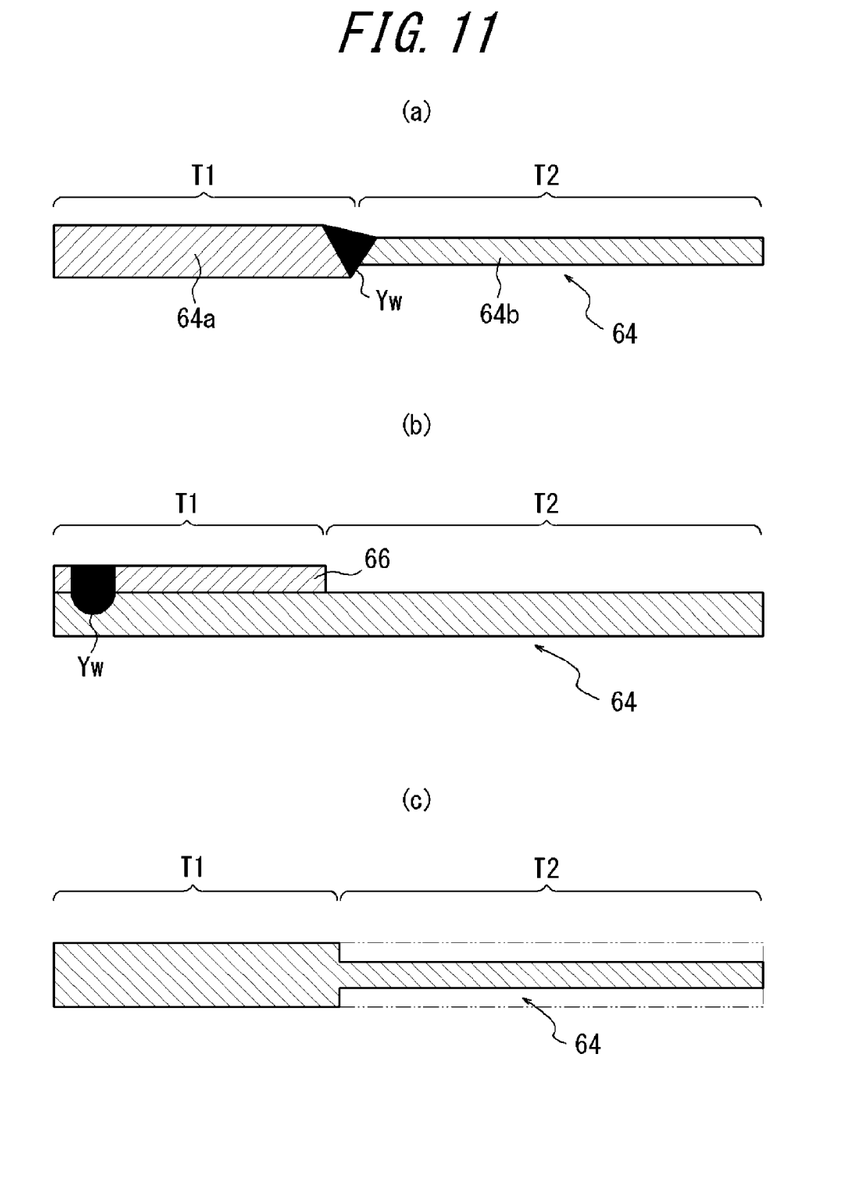

Concerning the step structure of the sub-plate 64, for example, it has been conventionally known that, as shown in FIG. 11 (a), the step structure of the sub-plate 64 to be interposed between two gasket substrates 50 each consisting of a metal plate is formed such that thin metal plates 64a, 64b having mutually difference plate thicknesses are selected to have a desired thickness difference; the metal plate 64a is positioned to constitute a cylinder hole peripheral portion (thick plate portion T1) overlapping with each full bead 52 surrounding the respective cylinder hole 54 of each gasket substrate 50; the metal plate 64b is positioned to constitute an outer portion (thin plate portion T2) outside of the cylinder hole peripheral portion; and the thin metal plates 64a, 64b are joined each other with laser welding (see Patent Literature 1). It is noted that the reference numeral Yw in the drawing illustrates a laser welded portion.

Furthermore, for example, it has also been known that, as shown in FIG. 11 (b), the step structure is formed such that a metal sub-plate 64 consists of a thin metal plate with a uniform thickness to be interposed between two gasket substrates 50 each consisting of a metal plate; a shim plate 66 also consisting of a metal plate is stacked up on the cylinder hole peripheral portion overlapping with each full bead 52 surrounding the respective cylinder hole 54 of each gasket substrate 50 so as to form a required step; and the sub-plate 64 and the shim plate 66 are joined each other with laser welding.

Yet further, for example, it has also been know that, as shown in FIG. 11 (c), the step structure is formed such that a metal sub-plate 64 with a uniform thickness to be interposed between two gasket substrates 50 each consisting of a metal plate is thinned by etching at the above-mentioned outer portion to form the required thickness difference between the cylinder hole peripheral portion (thick plate portion T1) and the outer portion (thin plate portion T2).

Patent Literature 1: Japanese Patent Application Publication No. 1995-243531.

SUMMARY OF INVENTION

However, in the conventional step structure as shown in FIG. 11 (a), two metal plates 64a, 64b having mutually different thicknesses are used to form the step between the cylinder hole peripheral portion (thick plate portion T1) and the outer portion (thin plate portion T2), so that the step can be set in minute units (in units of 0.01 mm). However, it requires a high precision alignment tool and an expensive laser welding machine to align the thick metal plate 64a and the thin metal plate 64b. Furthermore, a die with precise dimensional accuracy for blanking is required separately to blank the thick metal plate 64a and the thin metal plate 64b, which leads to a problem that the gasket becomes too expensive.

Further, in the conventional step structure as shown in FIG. 11(b), the thickness of the shim plate 66 equals to the thickness difference of the step, and the thickness of currently distributed thin steel plates in the industry increase by 0.05 mm. Thus, the thickness difference cannot be accurately adjusted as low as 0.01 mm, and the function of the step is difficult to be maintained on the thin plate having the thickness less than 0.1 mm due to the distortion, deformation and lift caused by the laser welding. Furthermore, high precision alignment tools and expensive laser welding machines are indispensable as is the case with the step structure as shown in FIG. 11 (a), which leads to a problem that the gasket becomes too expensive.

In the step structure as shown in FIG. 11 (c), the metal plate has been etched, which allows for the size of the step being set by as accurate as 5 µm. However, since etching is a chemical process, there are problems of the environmental impacts and high cost in terms of waste liquid disposal.

There are other methods for forming steps on the sub-plate, such as thermal spraying, plating, grinding, pressing and the like in addition to the ones mentioned above. However, the methods of thermal spraying, plating, and grinding are complicated in terms of the manufacturing time period and manufacturing process, and therefore, it is undeniable that these methods are not favorable cost wise.

The object of the present invention is, therefore, to provide a metal gasket capable of solving the above-mentioned problems with a high sealing performance at low cost.

The present invention is addressed to solve the above mentioned problems. The metal gasket for high-pressure combustion gas seal according to the present invention includes at least one metal gasket substrate having a cylinder hole opened at a position corresponding to a cylinder bore of a cylinder block of an internal combustion engine, and a circumferential bead formed circumferentially around the cylinder hole; wherein the circumferential bead is provided with a first bead portion formed of a pair of inclined walls each extending from the gasket substrate to a tip end, the tip ends of the pair of the inclined walls being spaced from each other, and a second bead portion extending from the tip ends of the inclined wall in a direction opposite to the protruding direction of the inclined walls to form a valley-like cross section; and the following relationships are satisfied: $Fh1>Fh2$, and $W1>W2$, where $Fh1$ is a height of the first bead portion, $Fh2$ is a height of the second bead portion, $W1$ is a half of a width of the circumferential bead, and $W2$ is a width of the second bead portion.

In the metal gasket according to the present invention, it is preferred that a ratio of the height of the second bead portion to the height of the first bead portion ($Fh2/Fh1$) is within a range of 0.037 to 0.37.

Further, in the metal gasket according to the present invention, it is preferred that two pieces of the gasket substrates are arranged so that the first bead portions of the respective circumferential beads face opposite directions.

Furthermore, in the metal gasket according to the present invention, it is preferred that three pieces of the gasket substrates are arranged so that the first bead portions of the circumferential beads protrude in opposite directions between either two adjacent gasket substrates.

Figure 12:
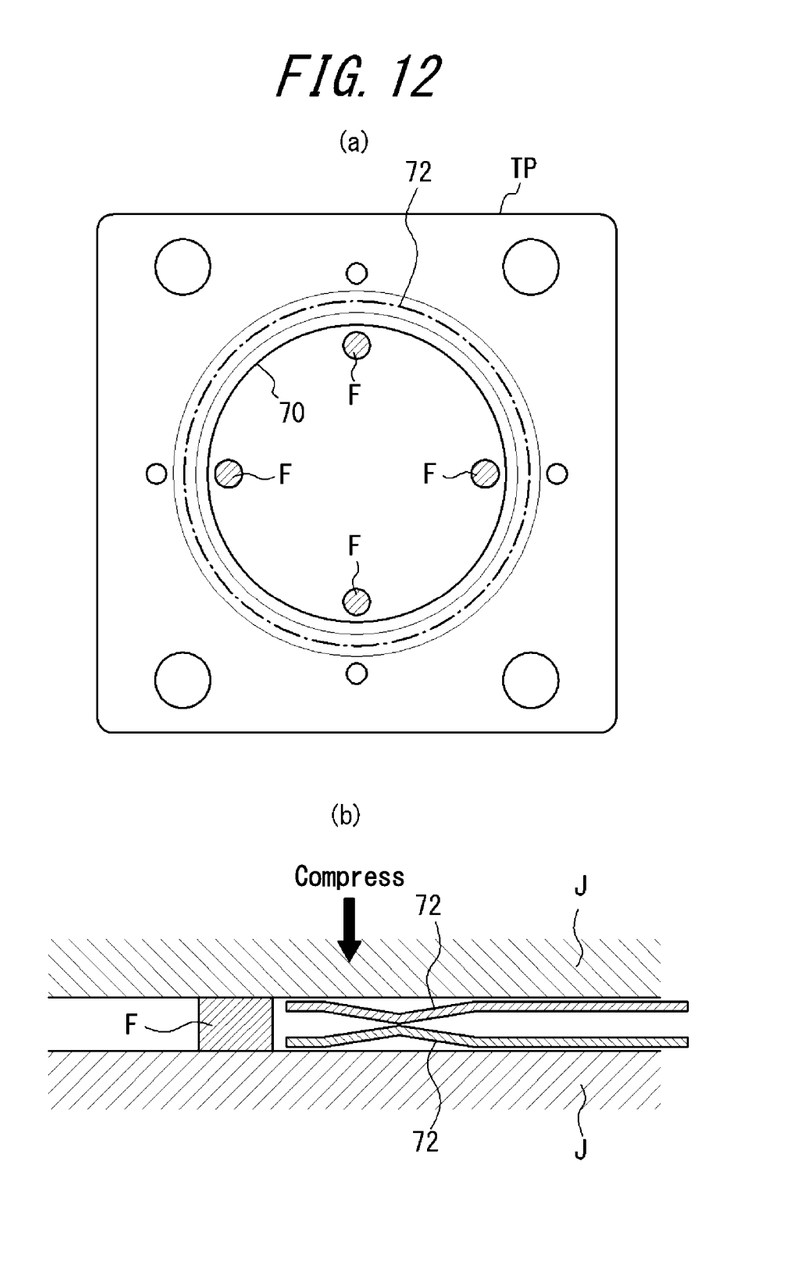
Figure 13:
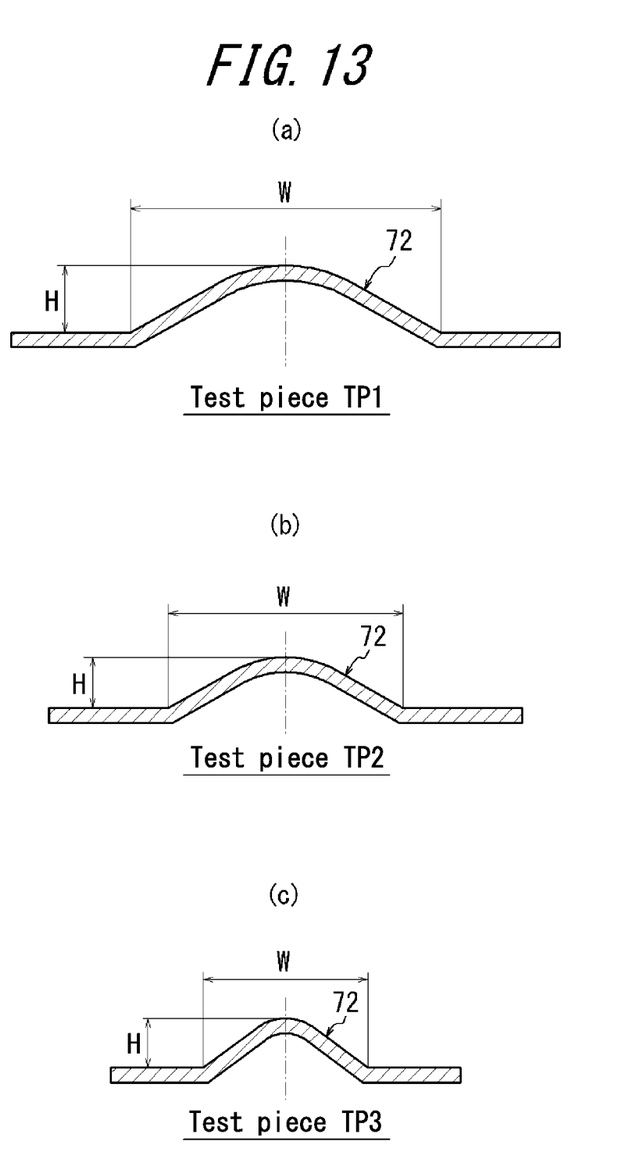
Figure 14:
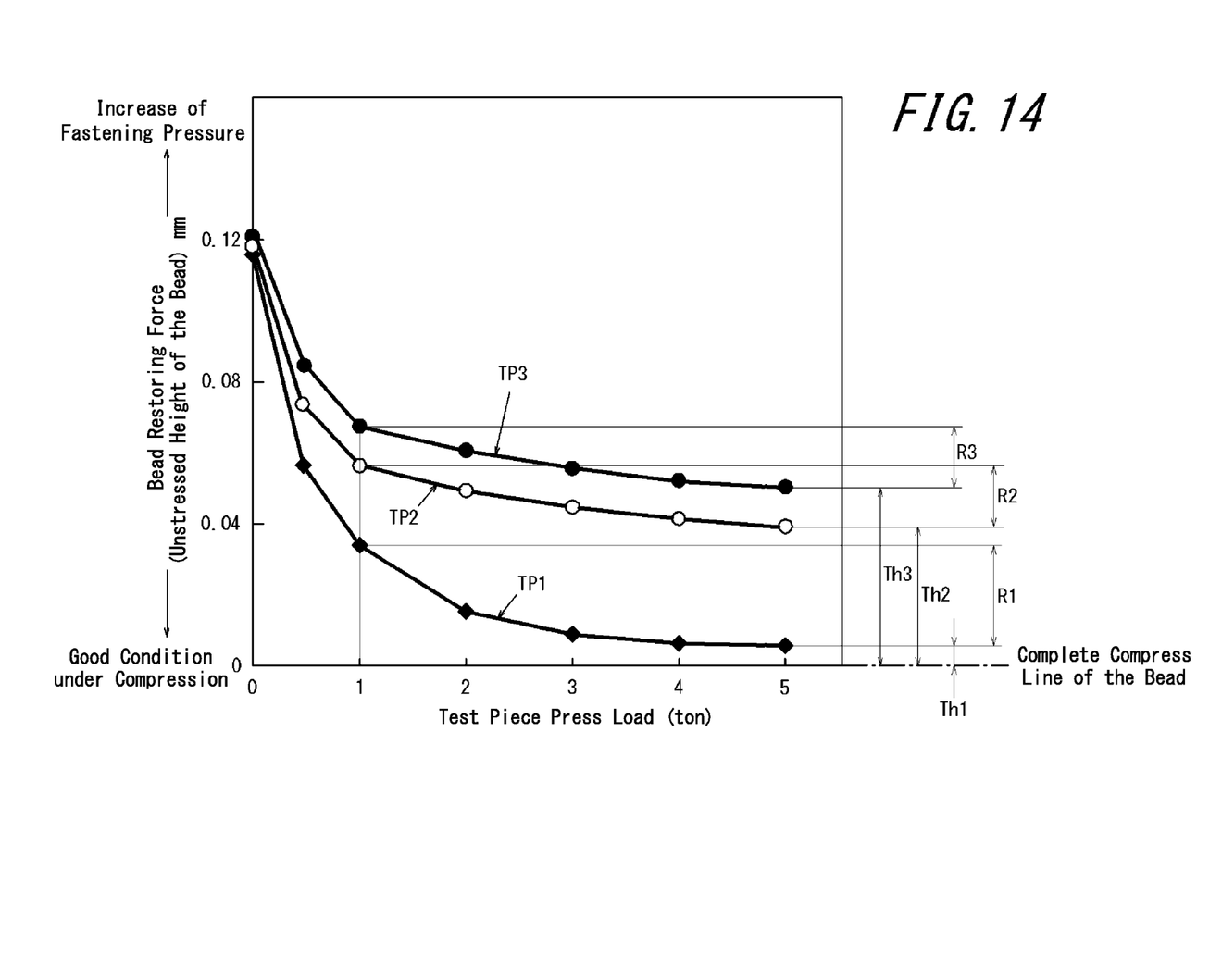
FIG. 14 shows graphs that represent relationships between the pressing loads and the restoring forces of the bead of the test pieces TP1 to TP3.

The background that led to adopting the above mentioned structure is described below in conjunction with the functions. First, in order to confirm whether the target fastening pressure can be reached by only using full beads each having a valley-like cross section without using a sub-plate with steps, the inventors of the present invention investigated the restoring characteristics (restoring force) by varying the widths and the heights of the full beads in three ways. In particular, three types of test pieces TP (TP1 to TP3) as shown in FIGS. 12(a) and 12(b) have been made These test pieces TP are made of stainless steel bands (SUS301-H-CSP t0.2) for springs that are the metal material used for gasket substrates. Each test piece has a circumferential bead 72 composed of a full bead with a valley-like cross section formed around a hole 70 (having the diameter of 87 mm). Each test piece TP1 to TP3 is clamped in between a pressing tool J to measure the restoring characteristics of the circumferential beads 72. The height H and width W of the circumferential bead 72 are selected to be larger in test pieces TP1, TP2 and TP3 in this order, as shown in FIG. 13, and to allow a ratio H/W (a ratio of the height H of the bead to the width W of the bead) of each test piece TP1 to TP3 to be 0.10. As a result, as shown in FIG. 14, it has been found that the circumferential bead 72 of the test piece TP1 with a large bead width W is compressed easily and also has a great restoring force R1; meanwhile, test pieces TP2 and TP3 having the bead widths W smaller than that of the test piece TP1 have smaller restoring forces R2, R3. Having smaller restoring forces means that the fastening pressure load of the circumferential bead could be significantly decreased due to the head lift phenomenon during the combustion of the engine. Therefore, the circumferential beads 72 of test pieces TP2 and TP3 are not suitable for the sealing against the high-pressure combustion gas.

During the restoring force measuring test, the inventors have reached an assumption based on the fact that the test pieces TP1 to TP3 are clamped by the pressing tool J after fuse wires F are placed at four locations at an inner diameter side of each test piece TP1 to TP3 as shown in FIGS. 12(a) and 12(b), and the "unstressed heights (amounts) of the circumferential bead" while the bead is pressed have also been measured. In other words, the "unstressed heights (amounts)" measured with using the fuse wires F are obtained by subtracting the "gasket total thickness" from the "fuse wire height under a load of 5000 kg", which represents the unstressed state of the circumferential bead 72 under a load of 5000 kg, and thus the unstressed height (amounts) of the circumferential bead 72 can be assumed to be equivalent to the thickness difference (the amount of the step) of the sub-plate of the above mentioned step structure metal gasket.

Each unstressed height Th1, Th2, Th3 of the circumferential bead 72 of the test piece TP1, TP2, TP3, respectively, is shown in FIG. 14. According to the results of the unstressed height of the circumferential bead, it is speculated that, besides the circumferential bead 72 of the test piece TP1 which has a good compressibility of the bead, both of the circumferential beads 72 of the test pieces TP2, TP3 potentially have the effect advantageously increasing the fastening pressure when the gasket is being fastened (equivalent to the thickness difference (step) effect of the step structure metal gasket, and referred to below simply as the "fastening pressure increase effect").

On the one hand, the circumferential bead 72 of the test piece TP1 with the largest bead width can be expected for a stable sealing performance since the restoring force is small as mentioned above to allow for smaller declination of the fastening pressure against the head lift. As is evident from the results in FIG. 14, the unstressed height Th1 of the circumferential bead is small, and therefore, the effect of the increase of the fastening pressure cannot be expected.

Based on the measurement results of the restoring forces and the unstressed heights of the circumferential beads while using the test pieces TP1 to TP3, the inventors have observed that when the circumferential bead with large bead width and large bead height allowing for a large restoring force is combined with the circumferential bead with small bead width and small bead height allowing for a large unstressed height of the beads to be in one bead shape, the decrease in the fastening pressure due to the head lift can be compensated by the restoring force of the circumferential bead with large bead width and large bead height while the sealing performance against high pressure combustion gas can be compensated by the effect of the increased fastening pressure in the circumferential beads with small bead width and small bead. Based on such observation, the inventors have conceived of a bead structure in which there is provided, on an apex of a first bead portion with large bead width and large bead height, a second bead portion with small width and small height protruding in a direction opposite to the rising direction of the first bead portion.

The metal gasket of the present invention have a circumferential bead consisting of two bead portions with different restoring forces and unstressed height. According to this circumferential beads structure, when the metal gasket is inserted between both deck surfaces of the cylinder block and the cylinder head and fastened by tightening bolts, the large restoring force of the first bead portion with large bead width and large bead height compensates the declination of the fastening pressure caused by the head lift phenomenon; the second bead portion with small bead width and small bead height yields a large unstressed height of the bead which is equivalent to the effect of the step structure in the conventional step type metal gasket. The axial force of the tightening bolts corresponding to the resulting unstressed height of the bead concentrates onto the circumferential bead of the gasket substrate as a pressure load to provide the circumferential bead with a great sealing performance against the combustion gas inside of the cylinder bore.

Since the metal gasket of the present invention does not need a sub-plate having a thickness difference (step), the formation of all beads including circumferential beads can be performed by the pressing process only, which eliminates the necessity of an expensive laser welding machine or a precision mold for butt welding. In addition, complicated quality control and environmental measure problems in the etching process caused by chemical processing can be dispelled, and, therefore, manufacturing at low cost and improvement of the production efficiency can be achieved.

Furthermore, when the ratio of the height of the second bead portion to the first bead portion (Fh2/Fh1) is set within the range from 0.037 to 0.37 in the metal gasket of the present invention, the bead crack due to the head lifting phenomenon can be thoroughly prevented from occurring to maintain a long term and stable sealing performance.

BRIEF DESCRIPTION OF DRAWINGS

FIG. 2 (a) is a cross-section view taken along a line X-X of FIG. 1.

FIG. 2 (b) is a partially enlarged view of FIG. 2 (a).

FIG. 11 (a) is a cross-section view explaining the method of forming the step structure of the sub-plate.

FIG. 11 (b) is a cross-section view explaining the method of forming the step structure of the sub-plate.

FIG. 11 (c) is a cross-section view explaining the method of forming the step structure of the sub-plate.

FIG. 12 (a) is a plan view of a test piece that was used in the course of developing the present invention.

FIG. 12 (b) is a cross-section view of the test piece taken along a radial direction of the circumferential bead of the test piece of FIG. 12 (a).

FIG. 13 (a) is a cross-section view of the circumferential bead of the test piece TP1.

FIG. 13 (b) is a cross-section view of the circumferential bead of the test piece TP2.

FIG. 13 (c) is a cross-section view of the circumferential bead of the test piece TP3.

BEST MODES FOR CARRYING OUT THE INVENTION

Embodiments of the present invention are described in detail below with reference to the drawings.

A first embodiment of the metal gasket for high-pressure combustion gas seal (referred to below simply as the "metal gasket") shown in FIGS. 1 and 2 includes two gasket substrates 2 stacked up on one another and each composed of a steel plate (e.g. SUS301-H-CSP 0.2t) coated with an NBR having the thickness of 0.025 mm on one or both of outer surfaces (the surfaces facing a cylinder block and a cylinder head). The two gasket substrates 2 stack up on top of another with a first bead portion of a circumferential bead (to be mentioned below) facing oppositely to each other, and are joined together via a crimping portion 4.

Figure 1:
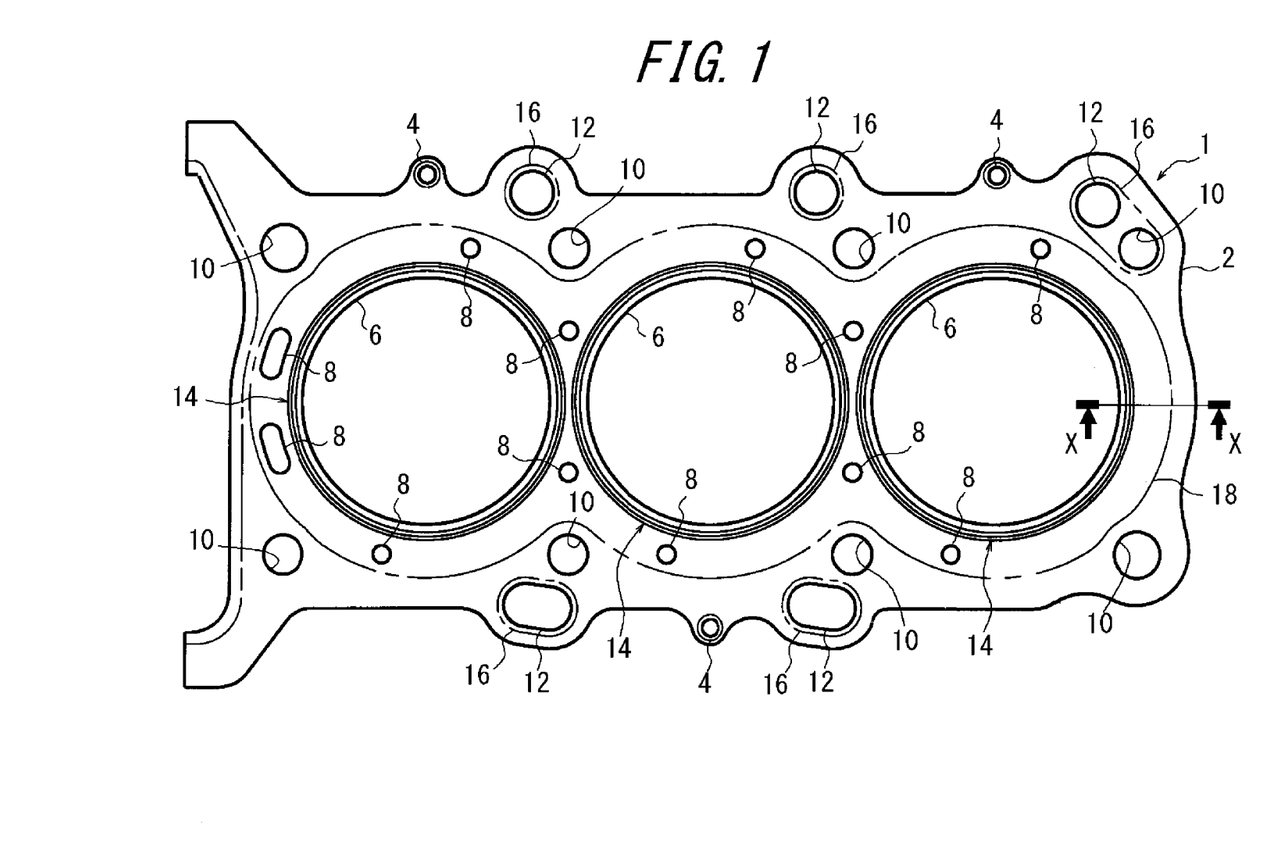
FIG. 1 is a plan view of a metal gasket of a first embodiment according to the present invention.

As shown in FIG. 1, two gasket substrates 2 each is provided with openings including at least one cylinder hole 6 (in this case three cylinder holes) formed at a position corresponding to a cylinder bore in a cylinder block of an internal combustion engine; a plurality of cooling water holes 8 formed around peripheries of the cylinder holes 6 in correspondence with water cooling jackets of the cylinder block and cooling water holes of the cylinder head of the internal combustion engine; bolt holes 10 through which tightening bolts for fastening the cylinder head (not shown) are inserted; and a lubricating oil hole 12. The gasket substrate further include a circumferential bead 14 disposed along a periphery of the cylinder hole 6, a lubricating oil hole bead 16 formed with a so called half bead surrounding the lubricating oil hole 12, and a peripheral bead 18 formed at a position surrounding entirely the circumferential bead 14 and the cooling water holes 8 without surrounding the lubricating oil hole beads 16.

Figure 2:
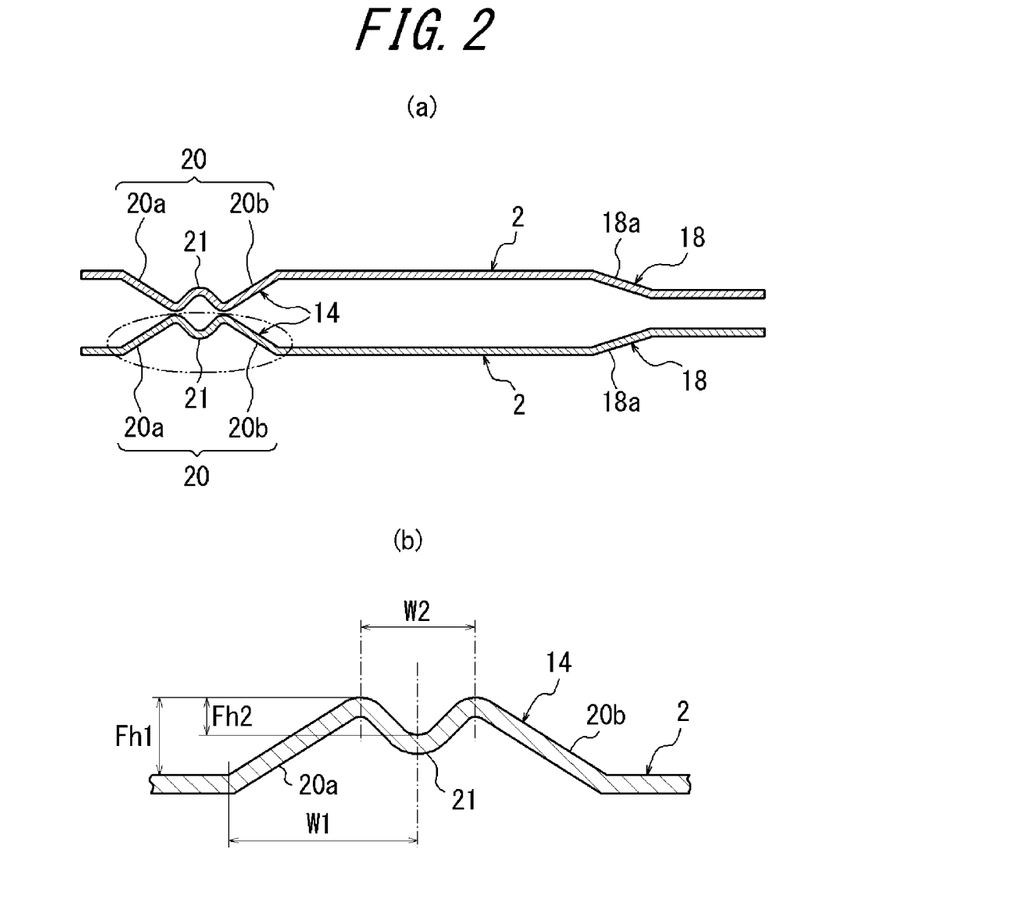

The peripheral bead 18 is, as shown in FIG. 2, formed of a so-called half bead consisting of one inclined portion. The circumferential bead 14 includes a first bead portion 20 which is to be pressed when the gasket is fastened and which is formed of a pair of inclined walls 20a, 20b extending upwardly from spaced positions in the radical direction of the cylinder hole 6 on the gasket substrate to respective tip ends to be closer and spaced with each other, and a second bead portion 21 having a valley like cross section which is to be pressed together with the first bead portion 20 when the gasket is fastened and which extends upwardly from the tip ends of the inclined walls 20a, 20b in a direction opposite to the extending direction of the inclined walls 20a, 20b. The circumferential bead 14 is also formed in a shape satisfying the following relationships: Fh1>Fh2 and W1>W2, where Fh1 is the height of the first bead portion 20, Fh2 is the height of the second bead portion 21, W1 is a half of the width (a distance measured along the radial direction) of the circumferential bead 14, and W2 is a width (a distance measured along the radial direction) of the second bead portion 21.

In the metal gasket 1 of the first embodiment, it is preferred in order to realize the desired fastening pressure (sealing performance) while preventing a bead crack that, for example, the gasket substrates 2 are formed of stainless steel plates (material for making springs) with a thickness of 0.20 to 0.25 mm; the width W1 of the circumferential bead is 1.10 to 1.75 mm; the bead height Fh1 of the first bead portion 20 of the circumferential bead is 0.10 to 0.35 mm; the bead height Fh2 of the second bead portion 21 is 0.01 to 0.10 mm; the width W2 of the bead is 0.6 to 1.3 mm; the ratio of the heights of the second bead portion 21 to the first bead portion 20 of the circumferential bead 14 (FH2/Fh1) is within a range of 0.037 to 0.37; and the ratio of the width W2 of the second bead portion to the half width W1 of the circumferential bead portion (W2/W1) is within a range of 0.55 to 0.73. The bead crack refers to a phenomenon that the circumferential bead causes fatigue breaking at the place where stress is concentrated due to repeated deformations of the circumferential bead resulting from the head lift.

The metal gasket 1 according to the first embodiment has the circumferential bead 14 consisting of two bead portions 20, 21 with different restoring forces and unstressed heights. According to the structure of the circumferential bead 14, when the metal gasket 1 is interposed between deck surfaces of the cylinder block and the cylinder head and fastened by the tightening bolts, the first bead portion 20 having great bead heights and bead widths resulting a large restoring force compensates the decrease of the fastening pressure caused by the head lift phenomenon; the second bead portion 21 having a small bead height and bead width generates a large unstressed height of the bead equivalent to the step effect in the conventional step type metal gasket; the axial force of the tightening bolts corresponding to the resulting unstressed height of the bead acts intensively as a pressure load on the circumferential bead 14 of the gasket substrates 2, so that a high sealing performance against the combustion gas in the cylinder bore 14 is provided to the circumferential bead. In addition, the axial force of the tightening bolt also acts on the peripheral bead 18 as a pressing load, which allows the peripheral bead 18 to generate a sealing performance against the cooling water in the cooling water jacket.

Moreover, since a sub-plate having a thickness difference (step) is not necessary for the metal gasket 1 according to the first embodiment, all the beads 14, 16, and 18 including the circumferential bead 14 can be formed by a pressing process only, which eliminates the need for use of expensive laser welding machines and a precision mold for butt welding as well as complicated quality control or environmental measures for etching by means of chemical treatments. Therefore, the metal gasket 1 according to the first embodiment can be manufactured at low cost, yet can also achieve the improvement of production efficiency.

In the metal gasket 1 according to the first embodiment, since the ratio of the height of the second bead portion 21 to the height of the first bead portion 20 of the circumferential bead 14 (Fh2/Fh1) is within the range of 0.037 to 0.37, the occurrence of bead cracking due to head lift phenomenon can be reliably prevented, and therefore, a stable sealing performance can be maintained for a long time.

Figure 3:
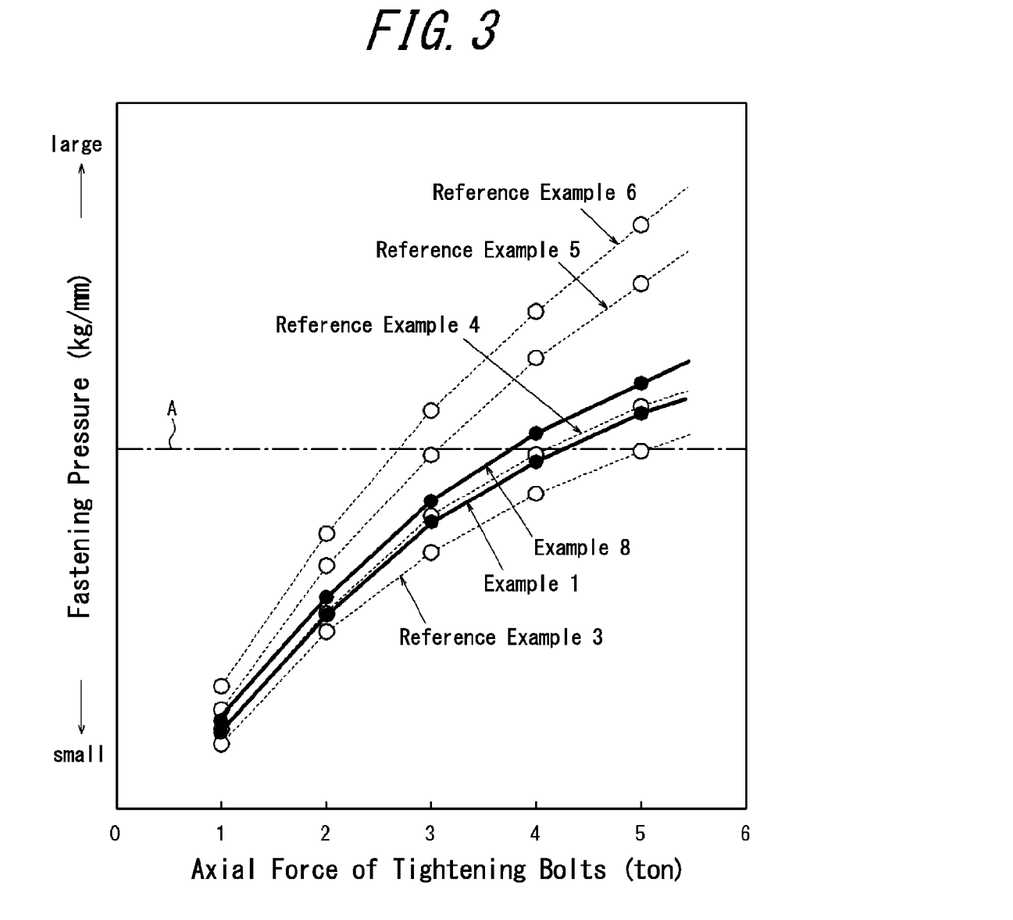
FIG. 3 shows graphs that represent relationships between the fastening axial force and the fastening pressure in examples of the metal gasket of the present invention and reference examples.

Table 1 and FIG. 3 below show various metal gaskets (examples 1 through 9) having different bead heights of the first bead portion 20 and the second bead portion 21 of the circumferential bead 14 having the structure of the metal gasket 1 according to the first embodiment, by way of example, with comparing the fastening pressure and the occurrence of the bead crack. The fastening pressure is measured with each different metal gasket assembled to an actual engine, and the occurrence of the bead cracks is measured by a visual inspection after the metal gaskets is vibrated for 107 times by the vibration tester with a maximum pressure load of 5,000 kg (equivalent to the fastening pressure of an actual engine). It is noted that, results of the fastening pressure of the step type metal gasket of comparative examples 3 to 6 shown in FIG. 10 are also shown in FIG. 3 for the purpose of comparison.

TABLE 1

| | Height of beads(mm) | | Ratio of bead heights | Bead crack Occurred/ |
| --- | --- | --- | --- | --- |
| | Fh1 | Fh2 | Fh2/Fh1 | Not Occurred |
| Example 1 | 0.27 | 0.01 | 0.037 | Not Occurred |
| Example 2 | 0.27 | 0.03 | 0.111 | Not Occurred |
| Example 3 | 0.27 | 0.05 | 0.185 | Not Occurred |
| Example 4 | 0.27 | 0.1 | 0.37 | Not Occurred |

TABLE 1-continued

|  | Height of beads (mm) | | Ratio of bead heights | Bead crack Occurred/ |
|---|---|---|---|---|
|  | Fh1 | Fh2 | Fh2/Fh1 | Not Occurred |
| Example 5 | 0.27 | 0.12 | 0.444 | Occurred |
| Example 6 | 0.22 | 0.01 | 0.046 | Not Occurred |
| Example 7 | 0.22 | 0.03 | 0.136 | Not Occurred |
| Example 8 | 0.22 | 0.05 | 0.227 | Not Occurred |
| Example 9 | 0.22 | 0.1 | 0.455 | Occurred |

It has been found from Table 1 and FIG. 3 that a high fastening pressure (A (kg/mm)) which is necessary to seal the high-pressure combustion gas can be obtained by the application of the present invention, and when the ratio of the height of the second bead portion to the height of the first bead portion (Fh2/Fh1) is within the range of 0.037 to 0.37, the occurrence of bead cracks can be prevented.

Figure 4:
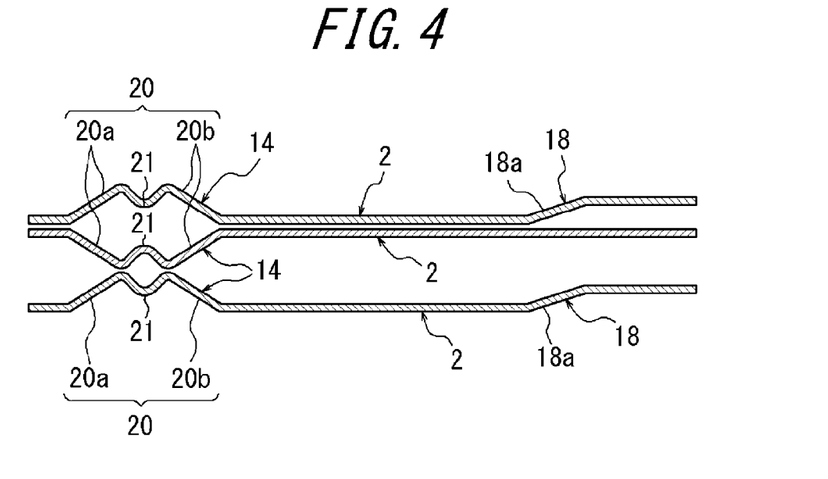
FIG. 4 is a cross-section view of the metal gasket of a second embodiment according to the present invention as viewed in the same manner as in FIG. 2 (a).

FIG. 4 is a cross section view of a second embodiment of the metal gasket according to the present invention as viewed the same manner as in FIG. 1. The metal gasket according to the second embodiment has the same configuration with that of the first embodiment except that three pieces of the gasket substrates having the configuration shown in FIGS. 1 and 2 are arranged so that the first bead portions 20 of the circumferential bead 14 protrude in opposite directions between either two adjacent gasket substrates 2. That is, the two outer gasket substrates 2 are arranged so that the extending direction of the first bead portions 20 of the respective circumferential beads 14 are consistent with each other, and the lowest (lowest side in FIG. 4) gasket substrate 2 and the intermediate gasket substrate 2 are arranged so that the first bead portions 20 of the respective circumferential beads 14 face with each other. According to the second embodiment, since the circumferential beads 14 are tripled, a higher sealing performance than that in the first embodiment can be obtained.

Figure 5:
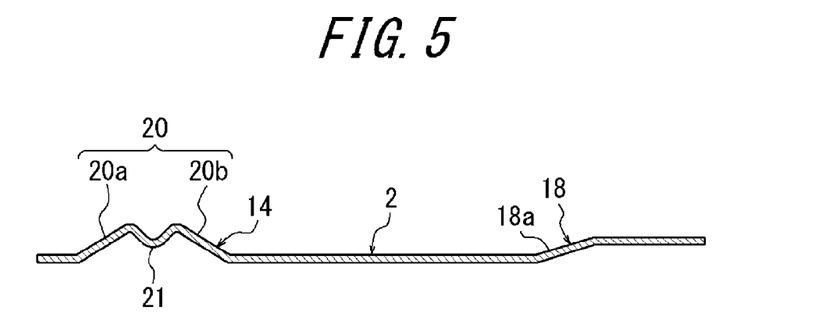
FIG. 5 is a cross-section view of the metal gasket of another modified example according to the present invention as viewed in the same manner as in FIG. 2 (a).

The present invention has been described with reference to the illustrated examples, however, the present invention is not limited to the embodiments described above and can be modified as appropriate within the scope of the appended claims. For example, the gaskets substrate may have only one layer as shown in FIG. 5. This type of metal gasket with a single plate structure may be suitably used in a general-purpose engine for a generator, a cultivator or the like, or a motorcycle engine.

Therefore, a metal gasket having a high sealing performance at low cost can be provided according to the present invention.

REFERENCE SIGNS LIST

1 Metal gasket
2 Gasket substrate
6 Cylinder hole
8 Cooling water hole
14 Circumferential bead
16 Lubrication oil hole bead
18 Peripheral bead
18a Inclined portion
20 First bead portion
20a, 20b Inclined walls
21 Second bead portion
Fh1 Height of a first bead portion
Fh2 Height of a second bead portion
W1 Half of a width of the circumferential bead
W2 Width of a second bead portion

The invention claimed is:

1. A metal gasket for providing a high-pressure combustion gas seal, the metal gasket comprising at least one metal gasket substrate having a cylinder hole opened at a position corresponding to a cylinder bore of a cylinder block of an internal combustion engine, and a circumferential bead formed circumferentially around the cylinder hole; wherein
the circumferential bead is provided with a first bead portion formed of a pair of inclined walls each extending from the gasket substrate to a tip end, the tip ends of the pair of the inclined walls being spaced from each other, and
a second bead portion extending from the tip ends of the inclined wall in a direction opposite to the protruding direction of the inclined walls to form a valley-like cross section; and
the following relationships are satisfied:

$$Fh1 > Fh2 \text{ and } W1 > W2$$

where Fh1 is a maximum height of the first bead portion, Fh2 is a maximum height of the second bead portion, W1 is a half of a maximum width of the circumferential bead, and W2 is a maximum width of the second bead portion, wherein Fh1 and Fh2 are measured along the protruding direction of the inclined walls and W1 and W2 are measured along a direction perpendicular to the protruding direction of the inclined walls, and wherein
a ratio of the height of the second bead portion to the height of the first bead portion (Fh2/Fh1) is within a range of 0.037 to 0.37.

2. The metal gasket according to claim 1, wherein the metal gasket comprises two metal gasket substrates arranged so that the first bead portions of the respective circumferential beads face opposite directions.

3. The metal gasket according to claim 1, wherein the metal gasket comprises three metal gasket substrates arranged so that the first bead portions of the circumferential beads protrude in opposite directions between either two adjacent gasket substrates.

* * * * *